Jan. 9, 1962     D. CLEJAN     3,016,025
FREIGHT TRANSPORTATION SYSTEMS AND METHODS
Filed June 12, 1959     8 Sheets-Sheet 1
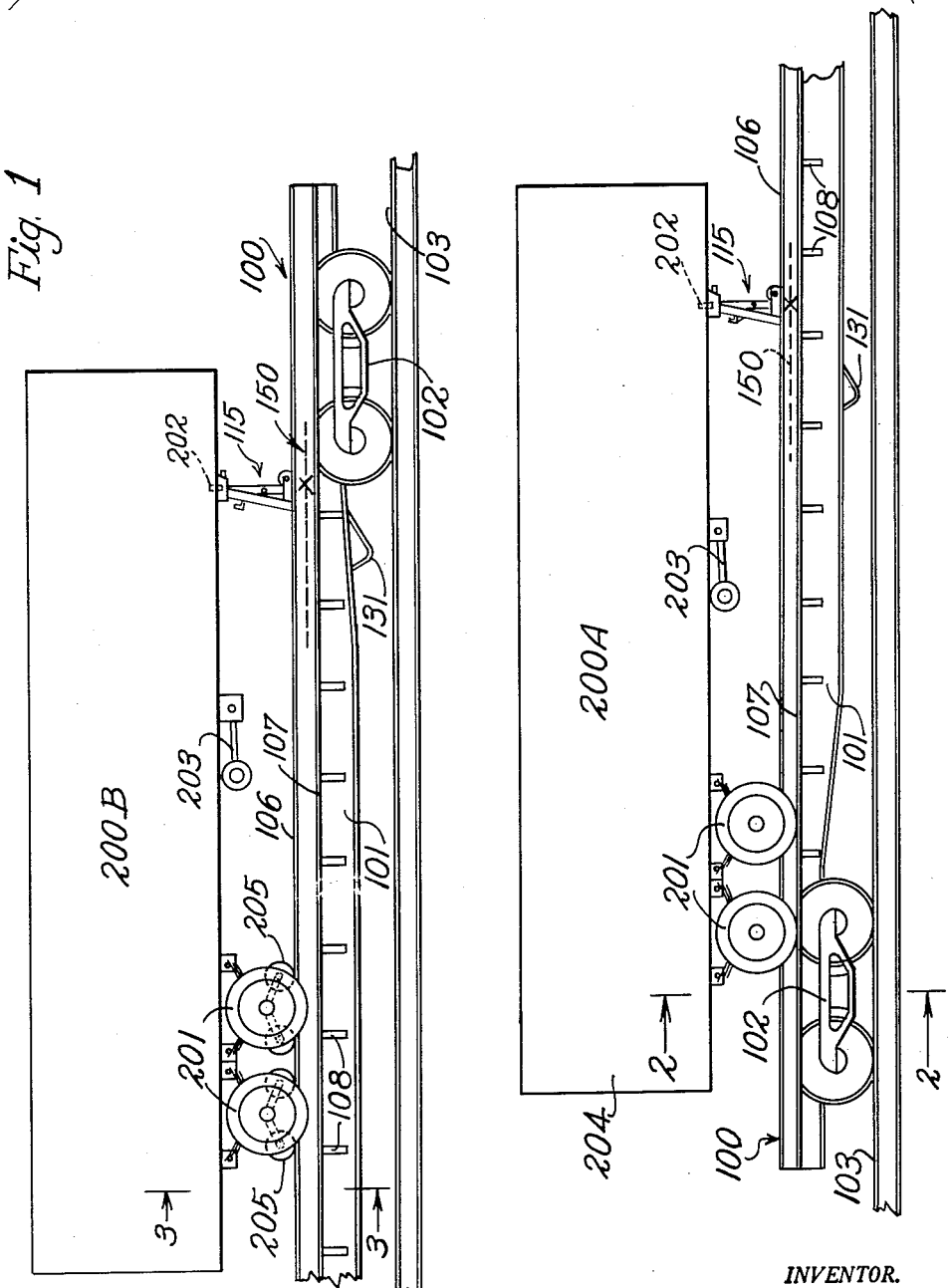
INVENTOR.
DEODAT CLEJON
BY
Prangley, Baird, Clayton, Miller
& Vogel, ATTORNEYS

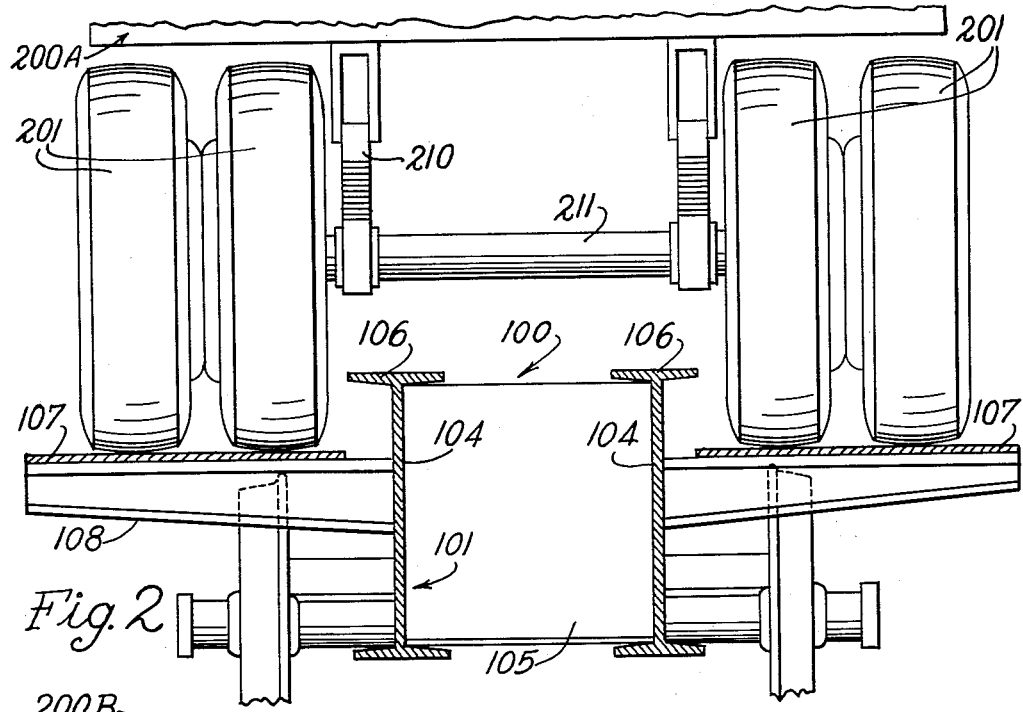
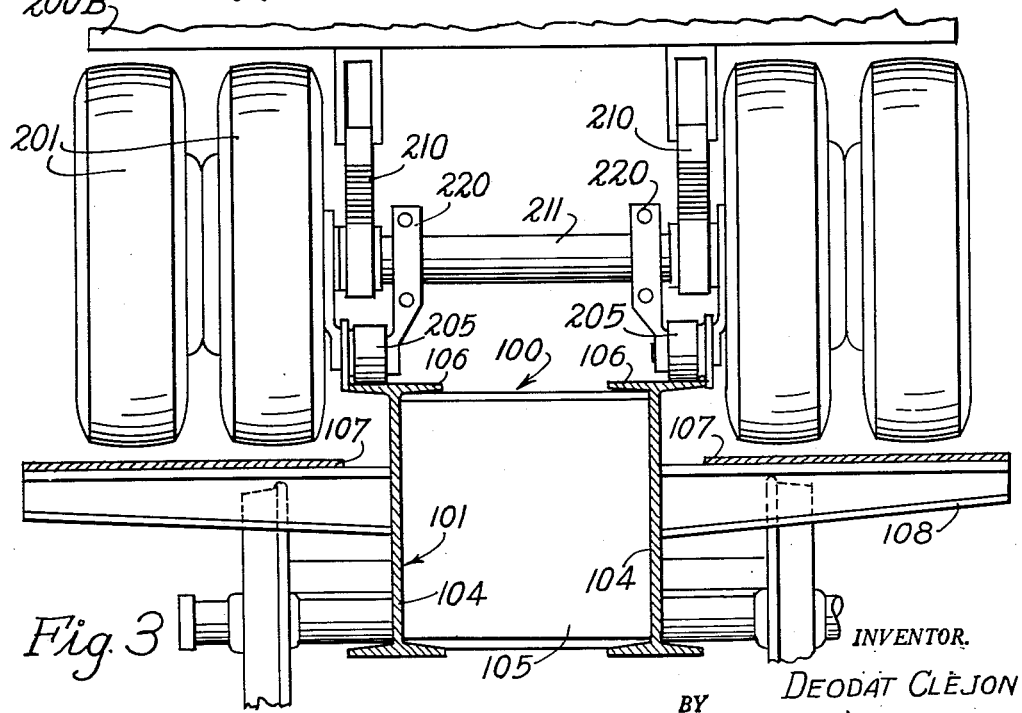

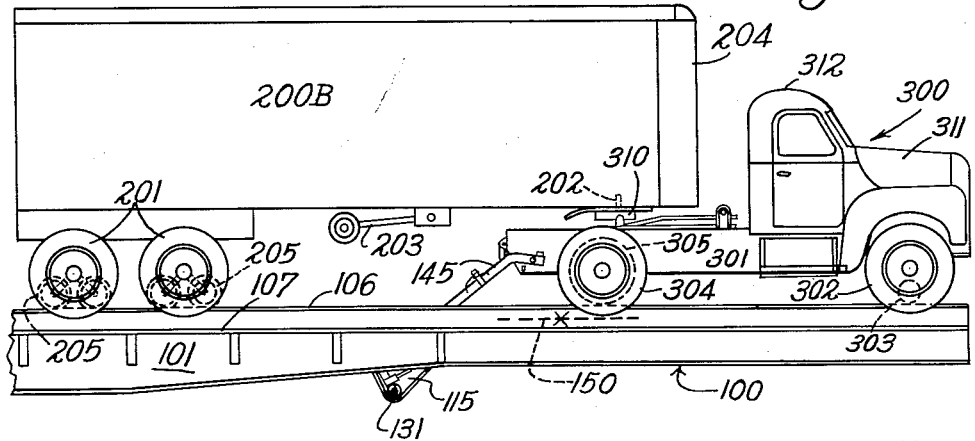
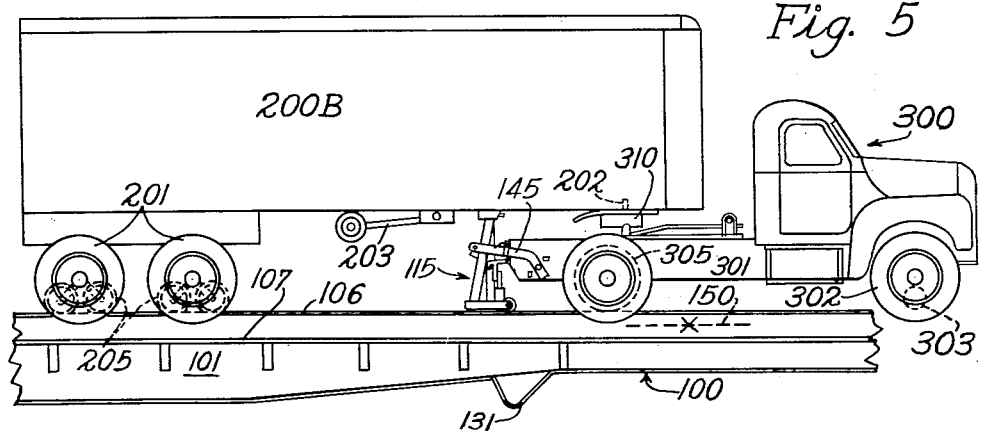
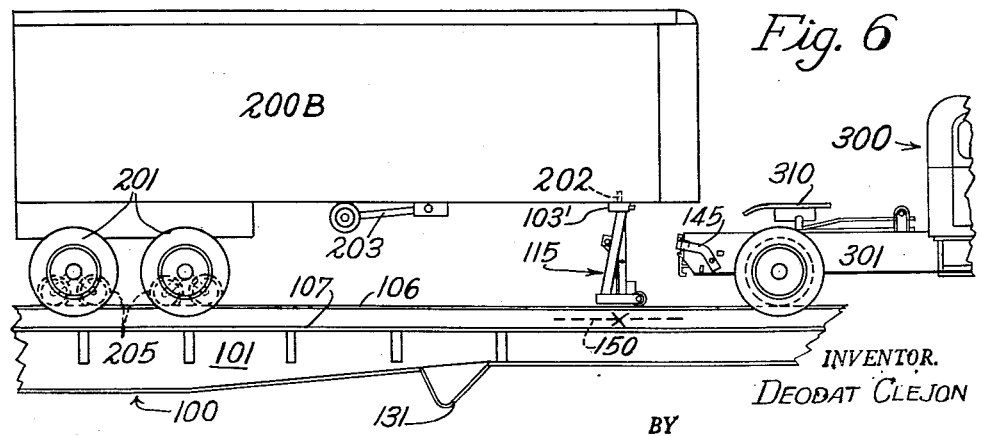

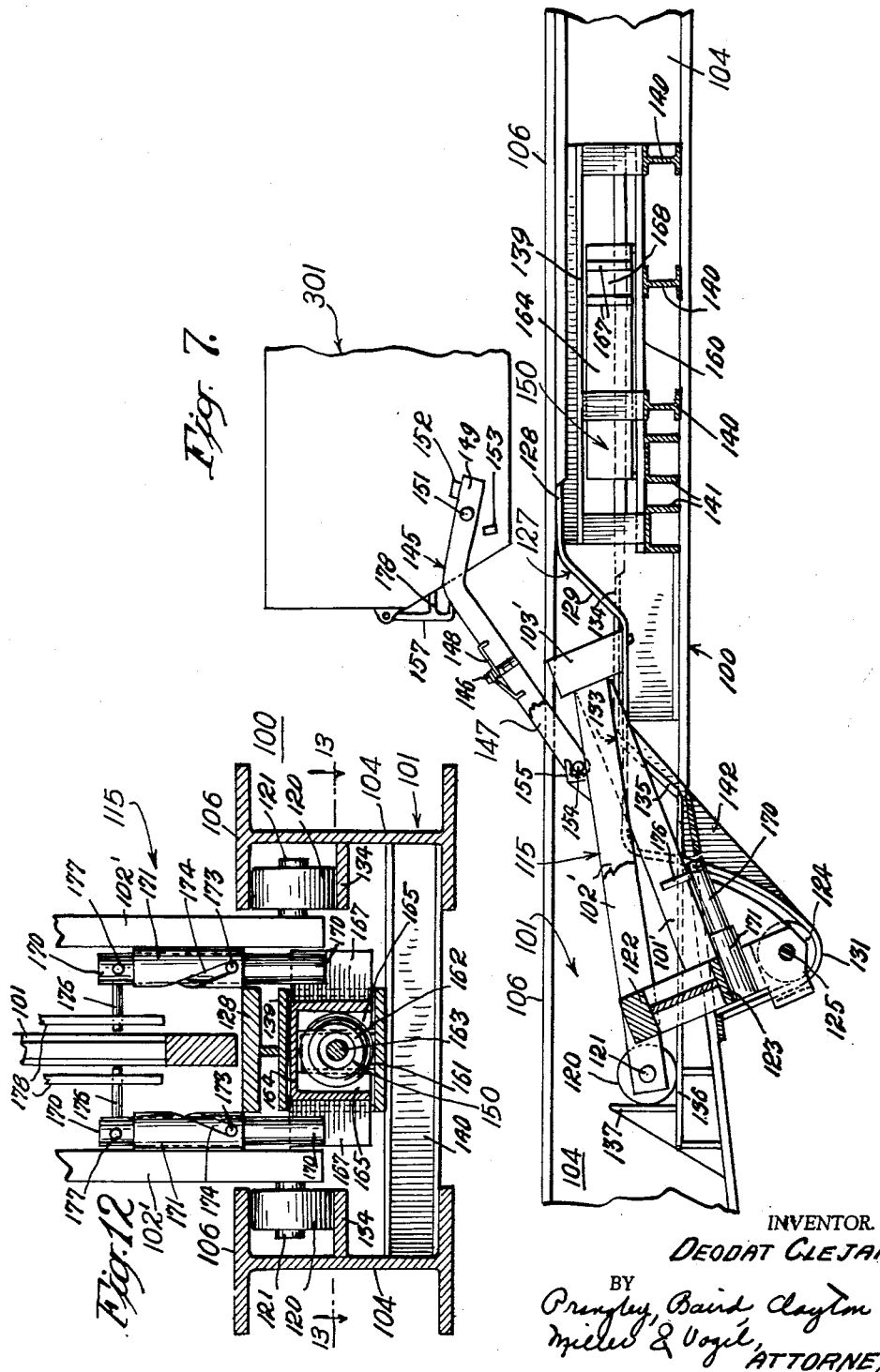

Jan. 9, 1962 D. CLEJAN 3,016,025
FREIGHT TRANSPORTATION SYSTEMS AND METHODS
Filed June 12, 1959 8 Sheets-Sheet 5

INVENTOR.
DEODAT CLEJAN
BY
Pronzley, Baird, Clayton, Miller
& Vogel, ATTORNEYS

Jan. 9, 1962 D. CLEJAN 3,016,025
FREIGHT TRANSPORTATION SYSTEMS AND METHODS
Filed June 12, 1959 8 Sheets-Sheet 6
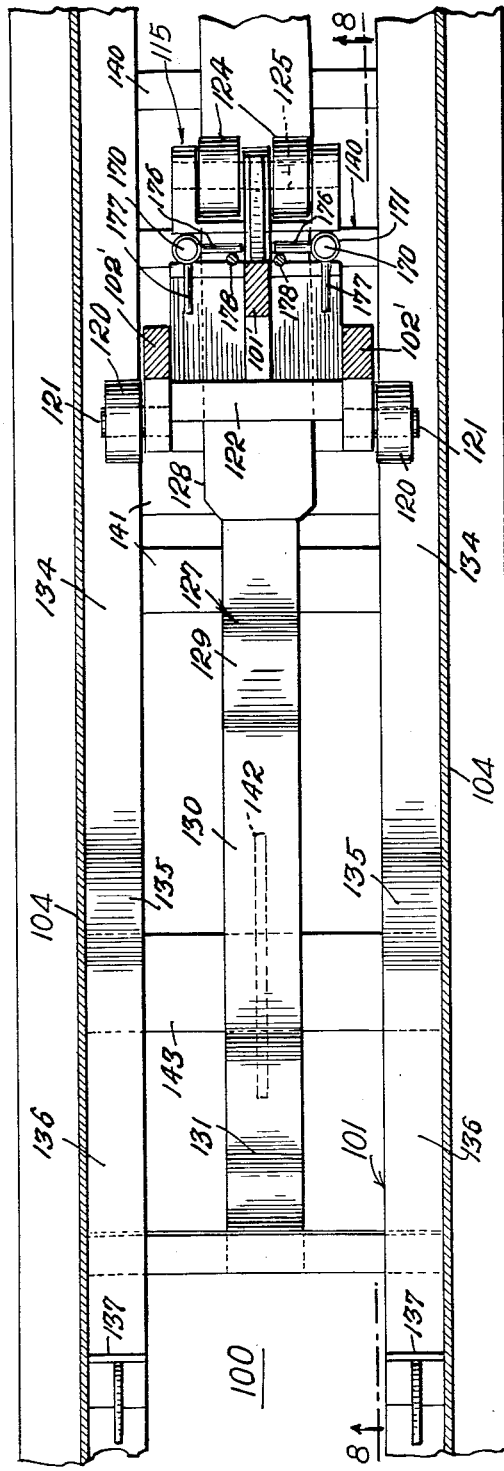
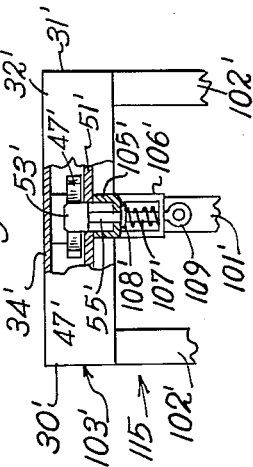
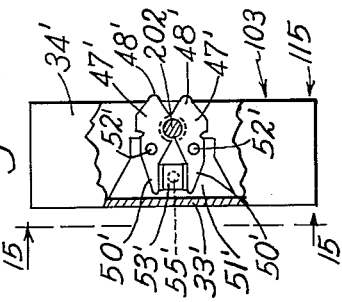
INVENTOR.
DEODAT CLEJAN
BY Brumbaugh, Baird Clayton
Miller & Vogel,
ATTORNEYS

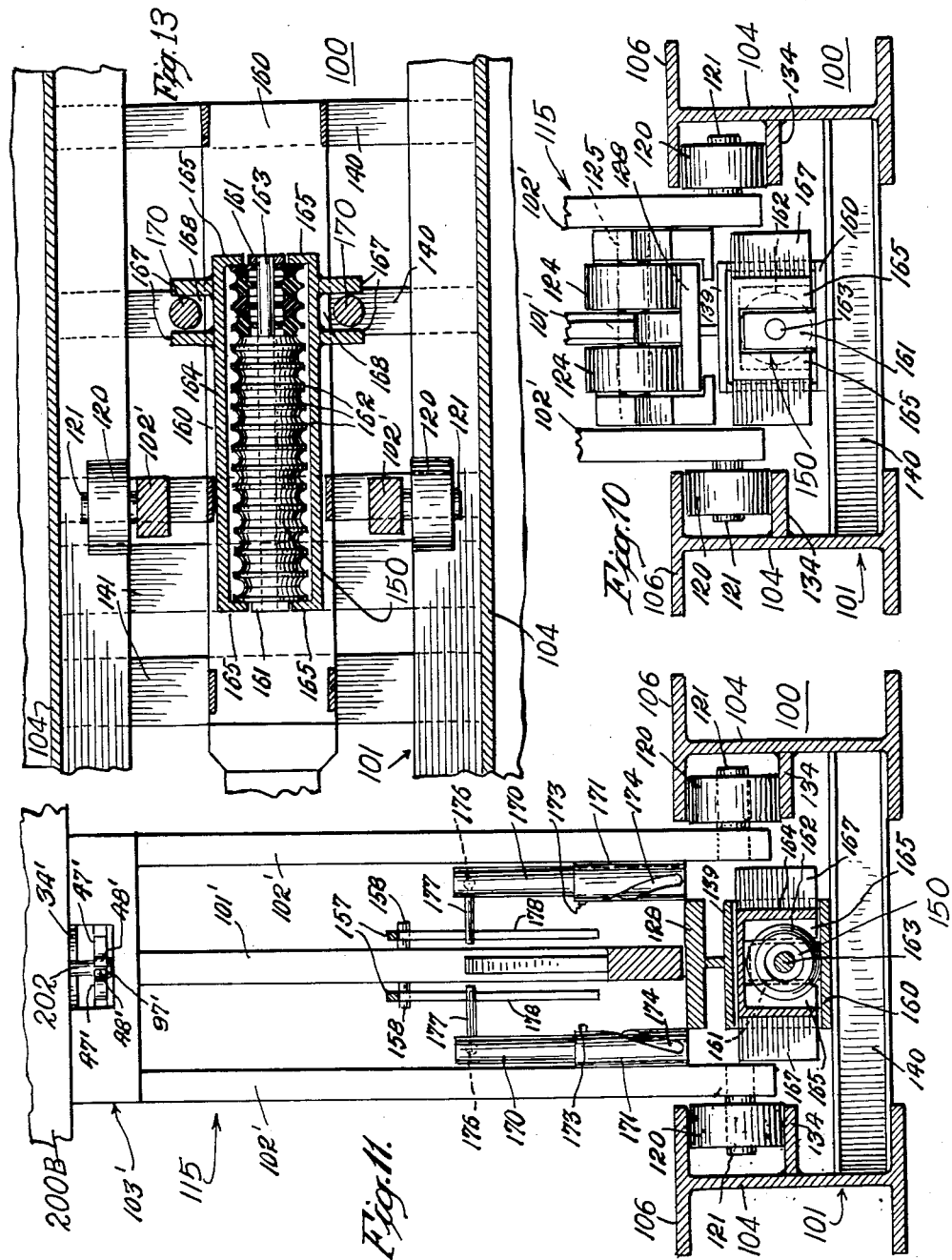

Jan. 9, 1962  D. CLEJAN  3,016,025
FREIGHT TRANSPORTATION SYSTEMS AND METHODS
Filed June 12, 1959  8 Sheets-Sheet 8
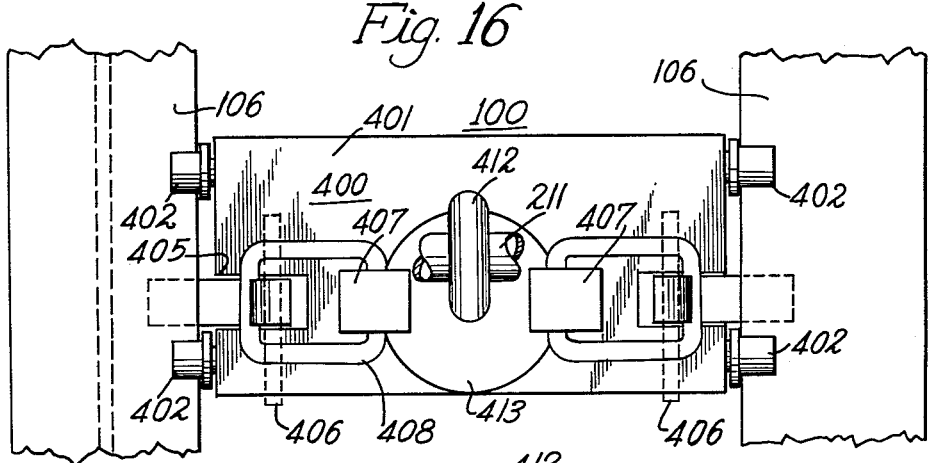
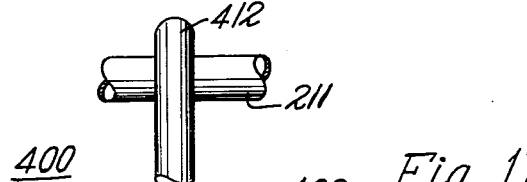
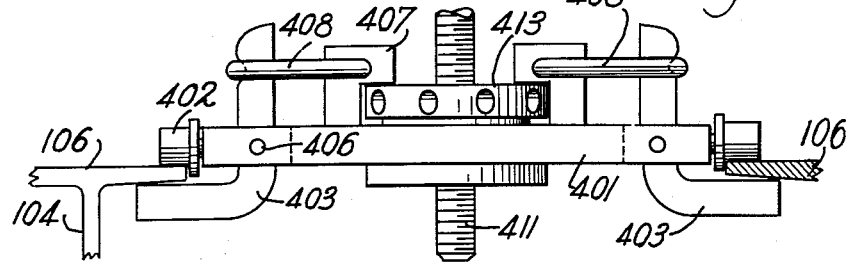
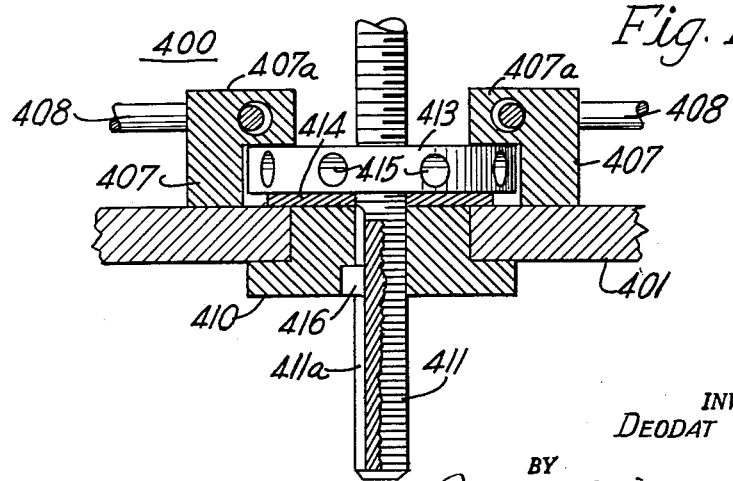
INVENTOR.
DEODAT CLEJON
BY
Prangley, Baird, Clayton, Miller & Vogel, ATTORNEYS

United States Patent Office 3,016,025
Patented Jan. 9, 1962

3,016,025
FREIGHT TRANSPORTATION SYSTEMS AND METHODS

Deodat Clejan, Chicago, Ill., assignor, by mesne assignments, to General American Transportation Corporation, Chicago, Ill., a New York corporation
Filed June 12, 1959, Ser. No. 819,899
12 Claims. (Cl. 105—368)

The present invention relates to freight transportation systems and methods, and more particularly to improved systems and methods of the general character of those disclosed in the copending application of Deodat Clejan, Serial No. 631,955, filed December 21, 1956, now Patent No. 2,960,043, granted on November 15, 1960. The present application comprises a continuation-in-part of the copending application of Deodat Clejan, Serial No. 734,645, filed May 12, 1958, now abandoned.

In the Clejan application, Serial No. 631,955, there is disclosed a freight transportation system, including a railway car that is constructed and arranged to receive and to transport indiscriminately road semi-trailers of first and second types; wherein the first type of semi-trailer includes a rear end carrying road wheels of standard road gauge and a front end carrying both a king pin and a front landing gear, and wherein the second type of semi-trailer includes a rear end carrying both road wheels of standard road gauge and track rollers of given narrow gauge depending therefrom and disposed inwardly of and above the road wheels carried thereby and a front end carrying both a king pin and a front landing gear. The railway car mentioned comprises a longitudinally extending center sill, a pair of trucks supporting the opposite ends of the center sill, a pair of longitudinally extending and laterally spaced-apart rails provided on the top of the center sill and constituting a track of the given narrow gauge and a pair of longitudinally extending and laterally spaced-apart platforms carried by the opposite sides of the center sill and projecting outwardly therefrom and disposed below the top thereof and constituting a roadway of standard road gauge. In the railway car, the roadway is arranged to engage and to support the road wheels of the first type semi-trailer, so as to mount the same upon the top of the center sill in straddling relation with the track and with the underportion thereof positioned above the track and out of contact therewith, and the track is arranged to engage and to support the track rollers carried by the second type semi-trailer, so as to mount the same upon the top of the center sill with the road wheels thereof projecting outwardly over the roadway and with the road wheels positioned above the roadway and out of contact therewith.

Further, this railway car comprises a motion limiting and cushioning device carried by the center sill, and a connector carried by the device and selectively operative into active and inactive positions with respect to the rear axle of the mounted semi-trailer and regardless of the type thereof, the connector in its active position engaging and holding the rear axle of the mounted semi-trailer, and the connector in its inactive position disengaging and releasing the rear axle of the mounted semi-trailer.

The front end of the mounted semi-trailer of either type mentioned is supported upon the track by its front landing gear in its operative position; and preferably the front landing gear is provided with track rollers for engagement with the track mentioned. On the other hand, in the event the front landing gear of the mounted semi-trailer is not provided with the track rollers mentioned, then there is temporarily secured thereto an adapter of the general character of that disclosed in U.S. Patent No. 2,864,321, granted to Deodat Clejan on December 16, 1958. In any case, the front end of the mounted semi-trailer is supported via its front landing gear in its operative position upon the track provided upon the top of the center sill of the railway car. Moreover, the mounting of the semi-trailer upon the top of the center sill of the railway car accommodates longitudinal rolling movements thereof along the center sill and regardless of the type of the mounted semi-trailer; whereby the motion limiting and cushioning device mentioned effects limited and cushioned fore-and-aft movements of the mounted semi-trailer longitudinally along the center sill and regardless of the type of the semi-trailer.

In this railway car, the trucks that support the opposite ends of the center sill are of standard rail gauge that is wider than the given narrow gauge of the track provided on the top of the center sill and that is narrower than the standard road gauge of the roadway carried by the center sill; and, of course, the track rollers, if provided on the semi-trailer, are of the given narrow gauge mentioned for cooperation with the track provided on the top of the center sill, as previously described.

In the loading and unloading of either type of the road semi-trailer mentioned, a tractor is employed that is provided at the rear end thereof with a fifth-wheel mechanism that cooperates with the king pin provided at the front end of the semi-trailer for the usual selective coupling and uncoupling purposes. Further, the tractor mentioned is provided with flanged wheels at both the front and rear ends thereof that are of the given narrow gauge mentioned, the flanged wheels at the rear end of the tractor comprising driving wheels, whereby the tractor may be readily driven along the track provided on the top of the center sill of the railway car under its own motive power.

In accordance with the method of loading a road semi-trailer of either type mentioned, as disclosed in the Clejan application, Serial No. 631,955, the fifth-wheel mechanism carried by the rear end of the tractor is coupled to the king pin carried by the front end of the semi-trailer; and this unit is then backed onto the railway car, so that the semi-trailer is disposed in a position to cooperate with the connector carried by the motion limiting and cushioning device arranged in the center sill of the railway car. In the event the semi-trailer involved is of the first type (a semi-trailer that is unequipped with the track rollers on the rear axle thereof), the road wheels of the semi-trailer support the rear end thereof upon the roadway carried by the sides of the center sill as the unit is backed into its proper position upon the railway car. On the other hand, in the event the semi-trailer involved is of the second type (a semi-trailer that is equipped with the track rollers on the rear axle thereof), the track rollers of the semi-trailer support the rear end thereof upon the track carried by the top of the center sill as the unit is backed into its proper position upon the railway car. In either case, the tractor rides the track provided on the top of the center sill of the railway car, as previously noted.

After the road semi-trailer has been backed into its proper position upon the railway car, the connector carried by the motion limiting and cushioning device is actuated into its active position to engage and to hold the rear axle of the semi-trailer regardless of the type thereof. Also, at this time, the front landing gear of the supported semi-trailer is actuated into its operative position to cooperate with the track provided on the top of the center sill, in the manner previously explained. Then the fifth-wheel mechanism of the tractor is actuated into its released position so as to disengage and to release the king pin carried by the front end of the supported semi-trailer; whereby the tractor may then be driven forwardly off of the track provided on the top of the center sill of the railway car. At this time, the road semi-trailer is mounted upon the top of the center sill of the railway car for the limited and cushioned longitudinal rolling movements along the track provided on the top of the center sill, as previously explained.

While the freight transportation system of the character disclosed in the Clejan application, Serial No. 631,955, as described above, is entirely satisfactory in operation, it is subject to the first criticism that the connector that is carried by the motion limiting and cushioning device provided in the center sill of the railway car must be capable of operation into a wide range of active positions in order properly to cooperate with the rear axle of the mounted road semi-trailer, by virtue of the fact that the axles of various road semi-trailers made by the different manufacturers have different road clearance, and is subject to the second criticism that the front end of the mounted road semi-trailer is supported through its front landing gear that was not ordinarily designed to withstand substantial vibration and shocks in use.

Accordingly, it is a general object of the present invention to provide a freight transportation system of the character described, wherein an improved railway car is provided that incorporates an arrangement including a standard for supporting the front end of the mounted road semi-trailer through its king pin that is ordinarily designed to withstand substantial vibration and shocks, thereby simplifying the loading and unloading of road semi-trailers with respect to the railway car.

Another object of the invention is to provide in a railway car of the character noted, an improved mounting arrangement, including the standard mentioned, which is selectively operatively connected and disconnected with respect to a motion limiting and cushioning device provided in the center sill thereof, thereby avoiding the necessity for the connection to this device from being other than a given and predetermined connection to the standard mentioned.

A further object of the invention is to provide in a railway car of the character noted, an improved mounting arrangement, including the standard mentioned, wherein the standard is carried by the center sill and selectively movable between a storage position disposed within a dwell provided in the center sill and below the top thereof and an erected position disposed out of the dwell in the center sill and above the top thereof, which standard in its erected position may be selectively connected and disconnected with respect to the motion limiting and cushioning device mentioned that is also provided in the center sill.

A further object of the invention is to provide in a freight transportation system of the character described an improved tie-down arrangement, including a dolly that may be provided for the purpose of selectively tying-down the rear end of the mounted road semi-trailer, in the event the road bed of the railway system is particularly rough or curved, rendering such special tie-down arrangement necessary or desirable.

A further object of the invention is to provide a railway car of the character described that is of improved construction and arrangement, including an improved standard that may be selectively employed therein for the purpose of selectively supporting the front end of a mounted road semi-trailer, wherein the motion limiting and cushioning device provided in the center sill thereof is selectively connectible with respect to the standard mentioned, for the purpose of providing limited and cushioned movements of the connected and mounted road semi-trailer.

A still further object of the invention is to provide an improved method of loading and unloading road semi-trailers upon railway cars in a freight transportation system of the character described, wherein the standard that is employed for the purpose of supporting the front end of the road semi-trailer may be conveniently brought into place subsequent to the placement of the road semi-trailer upon the top of the center sill of the railway car in the desired position of mounting thereof.

Further features of the invention pertain to the particular arrangement of the elements of the freight transportation system and of the steps of the method, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a fractured side elevational view of a freight transportation system embodying the present invention and including a railway car, the upper portion of this figure showing the right-hand end of the railway car mounting an equipped road semi-trailer, and the lower portion of this figure showing the left-hand end of the railway car mounting an unequipped road semi-trailer;

FIG. 2 is a greatly enlarged transverse view of the railway car, taken in the direction of the arrows along the line 2—2 in FIG. 2, and illustrating the supporting arrangement for the unequipped road semi-trailer;

FIG. 3 is a greatly enlarged transverse view of the railway car, taken in the direction of the arrows along the line 3—3 in FIG. 1, and illustrating the supporting arrangement for the equipped road semi-trailer.

FIG. 4 is an enlarged side elevational view of the top of the railway car and one of the road semi-trailers as shown in FIG. 1, and a tractor that is employed in loading the semi-trailer upon the railway car, this figure illustrating an initial step in the loading operation;

FIG. 5 is an enlarged side elevational view, similar to FIG. 4, of the top of the railway car and the mounted road semi-trailer, this figure illustrating an intermediate step in the loading operation;

FIG. 6 is an enlarged side elevational view, similar to FIGS. 4 and 5, of the top of the railway car and the mounted road semi-trailer, this figure illustrating the final loaded position of the semi-trailer upon the top of the railway car;

FIG. 7 is a greatly enlarged fragmentary vertical sectional view, taken through the right-hand end of the railway car, as shown in FIG. 1, and also further illustrating the initial step in the loading operation, as shown in FIG. 4;

FIG. 9 is a greatly enlarged fragmentary horizontal sectional view of the right hand end of the railway car, taken in the direction of the arrows along the line 9—9 in FIG. 8;

FIG. 10 is a greatly enlarged fragmentary vertical sectional view of the right-hand end of the railway car, taken in the direction of the arrows along the offset line 10—10 in FIG. 8;

FIG. 11 is another greatly enlarged fragmentary vertical view of the right-hand end of the railway car, taken in the direction of the arrows along the line 11—11 in FIG. 8, this figure illustrating the locking plungers carried by the standard in their unlocked positions;

FIG. 12 is another greatly enlarged fragmentary vertical sectional view, similar to FIG. 11, of the right-hand end of the railway car, and illustrating the locking plungers carried by the standard in their locked positions;

FIG. 13 is another greatly enlarged fragmentary vertical view, similart to FIG. 9, taken in the direction of the arrows, along the line 13—13 in FIG. 12, and illustrating the construction of the motion limiting and cushioning device incorporated in the center sill of the railway car;

FIG. 14 is a greatly enlarged fragmentary plan view of the upper portion of the standard, as shown in FIGS. 8 and 11;

FIG. 15 is a greatly enlarged fragmentary rear view of the upper portion of the standard, this figure being taken in the direction of the arrows along the offset line 15—15 in FIG. 14;

FIG. 16 is a plan view of a dolly that may be employed for the purpose of tying-down the rear end of one of the road semi-trailers in its mounted position upon the railway car, as shown in FIG. 1;

FIG. 17 is a fragmentary side elevational view of the dolly shown in FIG. 16; and FIG. 18 is an enlarged fragmentary vertical sectional view of the central portion of the dolly, as shown in FIG. 17, illustrating the mechanism for selectively moving the incorporated tie bar into its coordinate operating positions.

Figure 8:
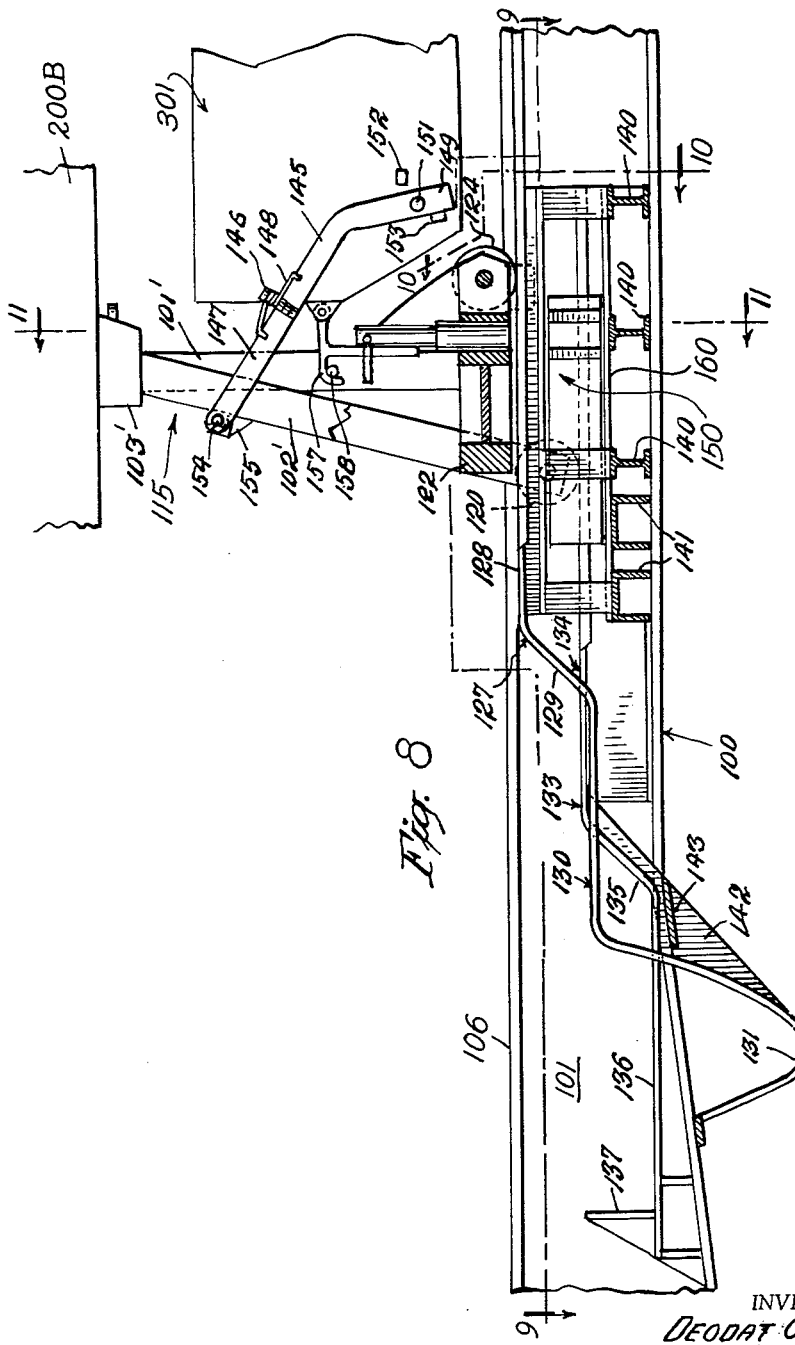
FIG. 8 is another greatly enlarged fragmentary vertical sectional view, similar to FIG. 7, taken through the right-hand end of the railway car, as shown in FIG. 1, and also further illustrating the intermediate step in the loading operation, as shown in FIG. 5, this figure being taken in the direction of the arrows along the line 8—8 in FIG. 9.

Referring now to FIG. 1 of the drawings, the freight transporation system there illustrated, and embodying the features of the present invention, essentially comprises a railway car 100 of the general construction and arrangement of that disclosed in the previously mentioned Clejan application, Serial No. 631,955; which railway car 100 is of the universal type in that it is adapted to support and to transport indiscriminately road vehicles of first and second types. As illustrated, a road vehicle 200A of the first type is mounted on the left-hand end of the railway car 100 and a road semi-trailer 200B of the second type is mounted on the right-hand end of the railway car 100. Specifically, the road semi-trailer 200A of the first type essentailly comprises a chassis provided with a rear end carrying road wheels 201 and a front end carrying both a king pin 202 and a front landing gear 203, as well as a body 204 that is adapted to receive the cargo that is to be transported. The road semi-trailer 200B of the second type is essentially of the same construction as that of the road semi-trailer 200A of the first type, except that it also carries at the rear end thereof dolly mechanism including track rollers indicated at 205. Accordingly, it will be understood that the road semi-trailer 200A of the first type is entirely conventional and is unequiped with respect to the dolly mechanism mentioned; whereas the road semi-trailer 200B of the second type is entirely conventional, except for the incorporation therein of the dolly mechanism mentioned. Thus hereinafter, the road semi-trailer 200A of the first type is referred to as an "unequipped" trailer, while the road semi-trailer 200B of the second type is referred to as an "equipped" trailer.

Before proceeding with the further description of the constructional details of the road semi-trailers 200A and 200B, it is pointed out that the railway car 100 of the universal type essentially comprises, as best shown in FIGS. 1, 2 and 3, a longitudinally extending center sill 101 supported at the opposite ends thereof by a pair of trucks 102 of standard rail gauge that cooperate with an associated railway track 103, also of standard gauge. The center sill 101 essentially comprises a pair of longitudinally extending and laterally spaced-apart I-beams 104 suitably connected together at longitudinally spaced-apart points by a plurality of cross braces 105. The top flanges 106 of the I-beams 104 constitute a pair of longitudinally extending and laterally spaced-apart rails provided on the top of the center sill 101 and constituting a track of given narrow gauge. Also, the railway car 100 comprises a pair of longitudinally extending and laterally spaced-apart platforms 107 respectively carried by the outer sides of the webs of the I-beams 104 and respectively projecting outwardly therefrom and disposed below the top flanges 106 and constituting a roadway of standard road gauge. In the arrangement, each of the platforms 107 is supported by a plurality of longitudinally spaced-apart and laterally projecting cantilever beams 108 disposed therebelow in supporting rleation therewith, the inner ends of the beams 108 being rigidly secured to the outer sides of the adjacent webs of the I-beams 104.

As best shown in FIG. 2, the unequipped road semi-trailer 200A is provided at the rear end thereof with spring mechanism 210 carrying a pair of laterally extending tandem axles 211 that, in turn, carry the road wheels 201 on the outer ends thereof, dual road wheels 201 being illustrated for the purpose of description. When the unequipped road semi-trailer 200A is mounted upon the top of the railway car 100, the road wheels 201 directly engage the platforms 107, so that the rear axles 211 straddle the top of the center sill 101 and are positioned above the track rails 106 and out of contact therewith, as clearly shown in FIG. 2.

As best illustrated in FIG. 3, the equipped road semi-trailer 200B is constructed at the rear end thereof in a manner identical to that of the unequipped road semi-trailer 200A, as shown in FIG. 2, except for the previously mentioned dolly mechanisms, indicated at 220 that carry the track rollers 205. For the purpose of the present description, the dolly mechanisms 220 have been illustrated as essentially comprising brackets suitably secured to the opposite sides of the rear axles 211 in straddling relation with respect to the associated spring mechanisms 210; whereby the track rollers 205 are disposed directly below the spring mechanisms 210 and are of the previously mentioned narrow gauge of the track rails 106. When the equipped road semi-trailer 200B is mounted upon the top of the railway car 100, the track rollers 205 carried by the rear axles 211 straddle the track rails 106 and engage the same for the support of the rear end of the trailer 200B, so as to mount the same upon the top of the center sill 101 with the road wheels 201 of the semi-trailer 200B projecting outwardly over the platforms 107 and positioned thereabove and out of contact therewith.

Recapitulating: when the unequipped road semi-trailer 200A is mounted upon the top of the center sill 101, the rear end thereof is directly supported by the engagements between the road wheels 201 and the platforms 107; and since the track rails 106 project upwardly well above the platforms 107, they are disposed inwardly and closely adjacent to the inner road wheels 201 and well above the bottom surfaces thereof; whereby it is not ordinarily necessary to tie-down the rear end of the semi-trailer 200A to the center sill 101. When the equipped road semi-trailer 200B is mounted upon the top of the center sill 101, the rear end thereof is directly supported by the engagements between the track rollers 205 and the track rails 106; and since the track rollers 205 are flanged adjacent to the outer ends thereof and thus straddle the track rails 106, it is not ordinarily necessary to tie-down the rear end of the semi-trailer 200B to the center sill 101. Moreover, in this case, the track rails 106 are disposed adjacent to the inner road wheels 201 and well above the lower surfaces thereof, thereby insuring that the rear end of the semi-trailer 200B occupies a straddling position with respect to the track rails 106, even in the event that the flanged rollers 205 should somehow become derailed with respect to the associated track rails 106.

Regardless of the type of the road semi-trailer 200A or 200B that is mounted upon the top of the railway car 100, the front end thereof is always supported upon the same type of standard 115, as illustrated in FIG. 1; and referring more particularly to FIGS. 7 to 15, inclusive, the standard 115 that is carried by the right-hand end of the railway car 100 is illustrated in detail, the standard 115 carried by the left-hand end of the railway car 100 being identical to the standard 115 illustrated. More particularly, the standard 115 has a skeletal frame, comprising a vertical central leg 101'; a pair of inclined legs 102' and a head 103'; and as explained more fully hereinafter, the standard 115 is selectively movable between a storage position, arranged in a dwell 131 provided in the hollow center sill 101 and between the I-beams 104, as illustrated in FIG. 7, and an erected position disposed out of the dwell 131 in the hollow center sill 101, as illustrated in FIG. 8.

When the standard 115 is arranged in its stored position, as shown in FIG. 7, it is located below the track rails 106 of the I-beams 104, so that it does not interfere with loading and unloading of the semi-trailers 200A and 200B with respect to the railway car 100; and when the standard 115 is arranged in its erected position, as shown in FIG. 8, it is located above the track rails 106 of the I-beams 104 and normally in supporting relation with the front end of the associated semi-trailer 200A or 200B.

As shown in FIGS. 14 and 15, a cap plate 34' extending across the top of the head 103', and supported by a pair of side walls 30' and 31', a front wall 32' and a rear wall 33', provides a seat for engaging and for supporting the front end of the semi-trailer 200B, the front end of which is held by the standard 115. A king pin locking mechanism (fifth-wheel mechanism) is mounted in the head 103' that includes a pair of jaws 47' provided with outwardly flared lips 48' extending through a cooperating opening in the front wall 32' of the head 103'. The jaws 47' are pivoted by pivot pins 52' that are fixed in a shelf 51' disposed below the cap plate 34'. The jaws 47' can be locked in closed positions around the king pin 202 carried by the front end of the semi-trailer 200B by a movable block 53' carried by a plunger 55'. More particularly, the plunger 55' is journalled in a bracket 105' fixed to the shelf 51' and in a yoke 106' fixed to the bracket 105'. A coil spring 107' surrounds the plunger 55' and bears against a collar 108' carried by the plunger 55' and against the yoke 106', thereby to urge the plunger 55' and the block 53' upwardly, so that the block 53' is moved between the legs 50' provided on the jaws 47', thereby to urge the jaws 47' into their locked positions with respect to the king pin 202. A ring 109 is attached to the lower end of the plunger 55' to permit manual retraction thereof and the consequent removal of the block 53' from its position disposed between the legs 50' carried by the jaws 47'; whereby the jaws 47' may move into their unlocked positions disengaging the king pin 202.

Referring now to FIGS. 7 and 8, the standard 115 in its storage position, as shown in FIG. 7, can be moved into its erected position, as shown in FIG. 8, by employing a tractor 300 provided with a chassis 301. A pair of axially aligned rollers 120 are mounted on axles 121 fixed to the outer legs 102' at the lower ends thereof; which legs 102' are connected together by a cross piece 122. The central leg 101' is connected with the cross piece 122 through a beam 123. An inner pair of axially aligned rollers 124 are mounted upon axles 125 supported by the beam 123. The pair of rollers 124 travel along a longitudinally extending and centrally disposed member 122, the opposite top edges of which define a track having an upper level 128 connected by a sloping element 129 with a lower level 130 and terminating in the previously mentioned dwell 131. The outer rollers 120 travel along a pair of longitudinally extending and laterally spaced-apart track rails 133 arranged on opposite sides of the members 127 and constituting a track. Each of the rails 133 has an upper level 134 connected by a sloping element 135 with a lower level 136 that terminates at a stop 137. The rails 133 and the stop 137 are fixed to the inner surfaces of the respective I-beams 104. The upper level 128 of the track 127 that supports the inner rollers 124, when the standard 115 is in its erected position, is mounted upon a yoke 139 that is borne by a plurality of transverse I-beams 140 and a plurality of channel members 141. The slope 129, the lower level 130 and the dwell 131 of the track 127, which bears the rollers 124, when the standard 115 is in its stored position, are suspended between the I-beams 104. The support for the track 127 is afforded by a plurality of cross pieces 142 and a brace 143. When the standard 115 is in its stored position, the outer rollers 120 rest against the stops 137 and the inner rollers 124 rest in the dwell 131.

Again referring to FIG. 1, in the railway car 100, it is noted that two longitudinally spaced-apart motion limiting and cushioning mechanisms 150 are incorporated in the center sill 101; which mechanisms 150 are hereinafter referred to as shock-absorbing mechanisms. Preferably, the shock-absorbing mechanisms 150 are identical, and as illustrated in FIGS. 7, 8, 10, 11, 12 and 13, the shock-absorbing mechanism 150 that is disposed adjacent to the right-hand end of the car 100 comprises a plate 160 mounted upon the channel members 141 and the I-beams 140 and disposed between the I-beams 104 and forwardly of the dwell 131 in which the standard 115 is arranged in its stored position. Two longitudinally spaced-apart upstanding posts 161 are secured to the upper surface of the plate 160; and a series of rubber pads 162 are arranged in abutting relation on a longitudinally extending rod 163 that is mounted at the opposite ends thereof in aligned openings provided in the posts 161. The pads 162 are contained within a substantially rectangular box-like structure including side walls 164 mounted for sliding movements on the top surface of the plate 160; and flanges 165 are fixed to the side walls 164 at their opposite ends and extend laterally inwardly toward the posts 161 so that the flanges 165 bear against the endmost pads 162 in the stack carried by the rod 163. Also two oppositely directed pairs of ribs 167 are attached to the outer surfaces of the walls 164, so as to provide upstanding pockets 168 therebetween. The standard 115 is selectively connectible to the shock-absorbing mechanism 150 by an arrangement that includes a pair of locking rods 170 that are slidably mounted in a pair of sleeves 171 that are fixed to the opposite sides of the standard 115. A pin 173 is fixed to each of the rods 170 and extends through a helical slot 174 provided in the corresponding sleeve 171 thereby to impart longitudinal movement to the locking rod 170 in response to rotary movement thereof. Two additional pins 176 and 177, projecting outwardly substantially at right angles to each other, are carried by the upper end of each of the locking rods 170. The pins 176 and 177 are engageable by associated fingers 178 carried by the rear end of the chassis 301 of the tractor 300 and are employed for a purpose more fully explained hereinafter. The locking rods 170 carried by the standard 115 cooperate with the pockets 168 provided between the ribs 167 carried by the side walls 164 of the shock-absorbing mechanism 150; whereby the locking rods 170 are selectively movable into locked and unlocked positions with respect to the pockets 168. More particularly, when the rods 170 occupy their retracted positions, as shown in FIG. 11, the locking rods 170 are withdrawn from the pockets 168, thereby to unlock the standard 115 from the shock-absorbing mechanism 150; and conversely, when the locking rods 170 occupy their projected positions, as shown in FIG. 12, the locking rods 170 extend into the pockets 168, thereby to lock the standard 115 to the shock-absorbing mechanism 150. As explained more fully hereinafter, the locking rods 170 may be selectively moved between their unlocked and locked positions, as respectively shown in FIGS. 11 and 12, by corresponding rotations thereof by virtue of the cooperation between the pins 173 and the helical slots 174 formed in the supporting sleeves 171; which selective rotations may be imparted to the locking rods 170 through the pins 176 and 177 carried by the upper ends thereof and employing the fingers 178 carried by the rear end of the chassis 301 of the tractor 300.

Considering now the present method of loading a road semi-trailer, such, for example, as the equipped semi-trailer 200B upon the railway car 100, reference is made to FIGS. 4 to 6, inclusive, and it is noted that the tractor 300 is employed in this operation. More particularly, the tractor 300 comprises the previously mentioned chassis 301, including a front axle, not shown, that carries both front road wheels 302 of standard road gauge and front flanged rollers 303 spaced inwardly with respect to the front road wheels 302 and of the given narrow gauge of the track provided by the track rails 106 on the top of the center sill 101. Also the chassis 301 includes a rear axle, not shown, that carries both rear road wheels 304 of standard road gauge and rear flanged wheels 305 spaced inwardly with respect to the rear wheels 304 and of the given narrow gauge of the track provided by the track rails 106 on the top of the center sill 101. In the tractor 300, both the rear road wheels 304 and the rear flanged wheels 305 comprise drive or track members; whereby the tractor 300 is propelled along a road or highway by the rear road wheels 304 and is propelled along the narrow gauge track provided by the track rails 106 on the top of the center sill 101 by the flanged wheels 305. Further, the rear end of the tractor 300 comprises a conventional fifth-wheel mechanism 310 that is adapted to cooperate with the king pin 202 carried by the front end of the semi-trailer 200B; the fifth-wheel mechanism 310 being selectively operative into open and closed positions with respect to the king pin 202, in the usual manner. Finally, the tractor 300 comprises the usual engine 311 and operator's cab 312.

First assuming that the road semi-trailer 200B is parked on a road adjacent to the section of railway track 103, the rear end thereof is supported by the rear road wheels 201 and the front end thereof is supported by the front landing gear 203 in the usual manner. The operator of the tractor 300 drives the same into a position adjacent to the semi-trailer 200B and then backs the tractor 300 under the front end of the semi-trailer 200B so as to cause the fifth-wheel mechanism 310 to support the front end of the semi-trailer 200B and to grasp the associated king pin 202, the fifth-wheel mechanism being operated into its locked position at this time. The front landing gear 203 is then operated into its retracted position in the usual manner, and then the driver operates the tractor 300 to pull the semi-trailer 200B into the vicinity of a centering device, not shown, that is operatively associated with one of the railway track 103 upon which the railway car 100 is located. The tractor 300 is then operated to back first the semi-trailer 200B and then the tractor 300 over the centering device and onto the adjacent end of the narrow gauge track provided by the track rails 106 on the top of the center sill 101 of the railway car 100.

In passing over the centering device, the weight of the unit (the trailer 200B and the tractor 300) is transferred from the road wheels 201, 304 and 302 onto the flanged wheels 205, 305 and 303; whereby the unit is then further backed along the track rails 106 provided upon the top of the center sill 101 into the required position.

At this time, it may be assumed that the standard 115 occupies its stored position as shown in FIGS. 4 and 7, in the center sill 101 of the railway car 100; and the rear end of the chassis 301 is backed into a position immediately forwardly of the associated dwell 131. The rear end of the chassis 301 has mounted on the opposite sides thereof a pair of arms 145 that are hinged at 146 so that the outer ends 147 thereof may be folded upon the inner ends thereof. A spring 148 normally urges the outer end 147 of the arm 145 into the extended position illustrated in FIG. 7; and the inner end 149 of each arm 145 is pivoted to the chassis 301 at 151. Also stops 152 and 153 are provided on the rear end of the chassis 301 in cooperating relation with the rear end 149 of each of the arms 145. The outer ends 147 of the arms 145 carry pins 154 that are adapted to engage fixtures 155 mounted on the outer legs 102' of the standard 115, as shown in FIG. 7. Also, the rear end of the chassis 301 is equipped with a pair of hooks 157 that are adapted to engage a pair of pins 158 that are fixed in the central vertical leg 101' for a purpose more fully explained below, and as shown in FIG. 8.

At this time, the outer ends of the arms 45 are moved into cooperating relation with respect to the standard 115 in its stored position, as shown in FIGS. 4 and 7; and more particularly, the pins 154 on the rear ends 147 of the arms 145 are moved into engagement with the fixtures 155 provided on the legs 102'. As illustrated in FIG. 4, the tractor 300 is disposed forwardly of the standard 115 in its stored position in the cooperating dwell 131, the rear end of the road semi-trailer 200B is disposed rearwardly of the standard 115, and the front end of the semi-trailer 200B is disposed over the standard 115. The tractor 300 is then backed rearwardly along the railway car 100 causing the pins 154 engaging the fixtures 155 to push rearwardly upon the standard 115; whereby the outer rollers 120 engaging the stops 137 bring about swinging of the standard 115 in the counterclockwise direction about the pivot pin 121, as viewed in FIG. 7, so that the standard 115 is swung upwardly from its stored position in the dwell 131 into an upstanding position and out of the dwell 131, as shown in FIG. 5. More particularly, this swinging movement of the standard 115 about the outer rollers 120 raises the inner rollers 124 out of the dwell 131 to the level of the lower portion 130 of the track 127; at which time the hooks 157 provided on the rear end of the chassis 301, as illustrated in FIG. 8, are actuated to engage the pins 158 carried by the center leg 101' of the standard.

Then, the fifth-wheel mechanism 310 provided on the rear end of the chassis 301 of the tractor 300 is actuated to uncouple the king pin 202 of the road semi-trailer 200B; and the tractor 300 is then driven forwardly on the railway car 100, thereby to draw the standard 115 in its upstanding position forwardly below the front of the semi-trailer 200B in order to cause the fifth-wheel mechanism carried by the head 103' to engage and to couple to the king pin 202 of the semi-trailer 200B. Accordingly, at this time, the weight of the front end of the semi-trailer 200B is transferred from the fifth-wheel mechanism 310 carried by the rear end of the chassis 301 of the tractor 300 to the fifth-wheel mechanism provided in the head 103' of the standard 115.

Furthermore, the forward movement of the standard 115 causes the outer rollers 120 to travel along the track rails 136, 135 and 134 and between the rails 134 and 106, as best shown in FIG. 12, and causes the inner rollers 124 to travel along the rail 130 and the slope 129 onto the top of the upper level 128 of the track 127. At this time, the standard 115 in its erected position, together with the road semi-trailer 200B connected thereto at the fifth-wheel mechanism incorporated in the head 103' of the standard 115, is moved further forwardly under the motive power of the tractor 300 until the standard 115 is disposed over and in alignment with the shock-absorbing mechanism 150. More particularly, the locking pins 170 carried by the standard 115 are moved into alignment with the pockets 168 arranged between the ribs 167 carried by the outer walls 164 of the mechanism 150, as shown in FIG. 11.

Further, at this time, the inner ends 47 of the arms 45 are collapsed back into their folded positions, as illustrated in FIG. 6, and the hooks 157 are actuated to disengage the pins 158 carried by the center leg 101' of the standard 115. Then, the fingers 178 provided on the hooks 157 carried by the rear end of the chassis 301 are actuated to engage the pins 177 carried by the upper ends of the locking rods 170. Slight forward movement of the tractor 300 at this time effects rotation of the locking rods 170 through the pins 177; whereby the pins 176 are brought into position so that they may be engaged by the fingers 178 carried by the hooks 157; whereby forward movement of the tractor 300 effects further rotation of the locking rods 70 through the pins 176. Accordingly, at this time the tractor 300 is manipulated to effect the required rotation of the locking rods 170 through the pins 177 and 176; which rotation of the locking rods 170 actuates the same from their unlocked positions of FIG. 11 into their locked positions of FIG. 12, due to the cooperation between the pins 173 carried by the locking rods 170 and the helical slots 174 provided in the sleeves 171. Thus, at this time, the standard 115 is locked to the shock-absorbing mechanism 150, whereupon the fingers 178 are disengaged from the pins 176 so that the tractor 300 may be driven forwardly and away from the standard 115. At this time, as illustrated in FIG. 6, the lower portion of the standard 115 is locked to the shock-absorbing mechanism 150 incorporated in the center sill 101, and the fifth-wheel mechanism incorporated in the head 103' of the standard 115 is connected to the king pin 202 carried by the front end of the road semitrailer 200B. Accordingly, the front end of the road semi-trailer 200B is supported by the standard 115 and the rear end of the semi-trailer 200B is supported by the track rollers 205 in engagement with the track rails 106 provided on the top of the center sill 101.

In view of the foregoing, it will be understood that during the transportation of the road semi-trailer 200B by the railway car 100, the railway car 100 is subjected to the usual longitudinal shocks delivered thereto through the string of railway cars from the locomotive; however, these longitudinal shocks are not transmitted directly to the road semi-trailer 200B mounted upon the top of the center sill 101 by virtue of the provision of the shock-absorbing mechanism 150 therebetween, as previously explained.

Also, as previously pointed out, two of the road semi-trailers are indiscriminately mounted upon the railway car 100; whereby the railway car 100 may carry two of the unequipped road semi-trailers 200A or two of the equipped road semi-trailers 200B or one each of the two types of the road semi-trailers mentioned; and in the last mentioned arrangement, it is noted that either of the road semi-trailers of either of the two types noted may be mounted on either end of the railway car 100.

The method of unloading a road semi-trailer 200A or 200B from the railway car 100 is carried out involving steps that are substantially the reverse of those described above in the loading operation; whereby the description of the unloading of such road semi-trailers 200A and 200B from the railway car 100 is omitted in the interest of brevity.

As previously explained, in conjunction with the support of the rear ends of the road semi-trailers 200A and 200B in connection with FIGS. 2 and 3, it is not ordinarily necessary to tie-down the rear ends of the road semi-trailers to the center sill 101 of the railway car 100, by virtue of the projection of the track rails 106 well above the lower surfaces of the road wheels 201 carried by the road semi-trailer 200A or 200B. However, in the event the road bed of the railway is particularly rough, which is usually the case over mountainous country, it is desirable to tie-down the rear end of the road semi-trailer 200A or 200B that is mounted upon the center sill 101 of the railway car 100; and for the purpose of accomplishing this function, any suitable device may be employed, such, for example, as the dolly 400, as shown in FIGS. 16, 17 and 18.

More particularly, the dolly 400 comprises a substantially rectangular flat plate 401 carrying four flanged rollers 402 at the four corners thereof and arranged to engage the track rails 106 of the railway car 100. Also the plate 401 carries at the opposite ends thereof, a pair of substantially L-shaped latches 403, each of the latches 403 being arranged in a cooperating slot 405 provided in the associated end of the plate 401 and secured in place upon a cooperating pivot pin 406. Accordingly, each of the latches 403 is selectively operative into latched and unlatched positions with respect to the lower surface of the flange 106 of the associated I-beam 104. Further, the top surface of the plate 401 carries a pair of laterally spaced-apart upstanding lugs 407 disposed inwardly with respect to the latches 403; and each of the lugs 407 carries a bail or buckle 408 pivotally mounted therein and operative into selective engagement with respect to the upper end of the associated latch 403. Accordingly, it will be understood that when one of the latches 403 occupies its latched position with respect to the associated flange 106, it may be restrained in this latched position by the cooperation of the buckle 408 with the upper end thereof, as clearly shown in FIGS. 16 and 17.

An opening is provided in the substantially central portion of the plate 401, into which there is fixedly secured a substantially cylindrical bearing member 410 having a centrally disposed threaded opening therethrough in which there is arranged a threaded tie rod 411. The upper end of the tie rod 411 terminates in a hook 412 that is adapted to hook over the cooperating rear axle 211 of an associated road semi-trailer 200A or 200B. The threaded shank of the tie rod 411 carries a substantially cylindrical nut 413 thereon disposed adjacent to the upper surface of the plate 401 and separated therefrom by an annular washer 414 also surrounding the threaded shank of the tie rod 411. The outer periphery of the nut 413 carries a number of circumferentially spaced-apart holes 415 therein that are adapted to receive the end of an operating lever or bar for the purpose of effecting selective rotation of the nut 413 and corresponding vertical movement of the tie rod 411. In the arrangement, the lugs 407 are disposed on opposite sides of the nut 413 and are provided with inwardly turned projections 407a that overhang the top surface of the nut 413, thereby insuring that the rotation of the nut 413 imparts the desired vertical movement to the tie rod 411. Also a spline 411a is provided in the lower end of the shank of the tie rod 411 that receives a key 416 fixedly secured to the bearing member 410; which spline 411a and key 416 insures that the rotary movement of the nut 413 is not imparted to the tie rod 411.

In view of the foregoing description of the construction and arrangement of the dolly 400, it will be understood that in the use thereof, the same is placed upon the top of the center sill 101 of the railway car 100, so that the flanged rollers 402 ride longitudinally along the track rails 106. The nut 413 is suitably rotated by a cooperating operating lever or bar, not shown, so as to project upwardly the hook 412 carried on the extreme upper end of the tie rod 411 and specifically so that the hook 412 is disposed at an elevation above the rear axle 211 of the mounted road semi-trailer 200A or 200B. The dolly 400 is then rolled longitudinally along the track rails 106 to a position disposed below the rear end of the mounted semi-trailer 200A or 200B, and so that the hook 412 overhangs the rear axle 211 thereof. At this time, the nut 413 is suitably rotated so as to retract the tie rod 411 in order to cause the hook 412 to embrace and engage the aligned rear axle 211 mentioned. Continued rotation of the nut 412 draws the tie rod 411 downwardly effecting firm clamping of the engaged rear axle 211 to the track rails 106, assuming that the latches 403 occupy their latched positions previously described, and are restrained in such positions by the associated buckles 408. At this time, the rear end of the mounted road semi-trailer 200A or 200B is firmly secured or tied-down to the track rails 106. However, the dolly 400 accommodates the previously described longitudinal movements of the mounted road semi-trailer 200A or 200B under the control of the shock-absorbing mechanism 150 incorporated in the center sill 101 of the railway car 100 by virtue of the fact that the dolly 400 is readily rollable or slidable (as the case may be) along the track rails 106 in guided relation therewith. The use of the dolly 400 positively prevents derailment of the flanged rollers 205 mounted upon the rear axle 211 of an equipped road semi-trailer 200B and also prevents shifting of the road wheels 201 of an unequipped road semi-trailer 200A upon the engaged platform 107.

The subsequent removal of the dolly 400 from its cooperative position tying-down the rear end of a mounted road semi-trailer 200A or 200B, will be apparent in view of the foregoing description of the construction and arrangement thereof; whereby this description is omitted in the interest of brevity.

In view of the foregoing description of the construction, arrangement and method of operation of the freight transportation system, it will be understood that each of the two standards 115 incorporated in each railway car 100 may be selectively operated between its stored position and its erected position as respectively shown in FIGS. 4 and 6, utilizing the tractor 300 that is also employed for the purpose of loading and unloading the road semi-trailers 200A and 200B upon the railway car 100, and that each of the dollies 400 is fully demountable with respect to the railway car 100 and may be placed and removed with respect to the top of the center sill 101 thereof as required. Moreover, it is reiterated that the unequipped road semi-trailer 200A and equipped road semi-trailer 200B may be readily loaded and unloaded indiscriminately upon the railway car 100, utilizing the cooperating tractor 300. In actual practice, it will, of course, be appreciated that a plurality of the railway cars 100 are normally connected in a string or train; and each of the railway cars carries bridging structure, not shown, that may be selectively operated in order to effect bridging between the track rails 166 carried upon the tops of the center sills 101 of the several connected railway cars 100; whereby the various road semi-trailers 200A and 200B are normally loaded upon the string of railway cars 100 from a predetermined end of the string that is operatively associated with the centering device, not shown, that is employed for the purpose of effecting the transfer in either direction of a vehicle between the roadway and the auxiliary track provided on top of the railway cars 100.

In view of the foregoing, it is apparent that there has been provided an improved freight transportation system that is especially adapted for the transporting by rail of road semi-trailers, which system involves an improved construction and arrangement of the railway car utilized and including an improved standard for supporting the front end of the road semi-trailer in its mounted position upon the top of the frame of the railway car while accommodating limited and cushioned longitudinal movements of the mounted road semi-trailer. Also, an improved method of loading and unloading the road semi-trailers with respect to the railway car has been provided that accommodate such loading and unloading in a simple and efficient manner, thereby greatly contributing to the economy of the freight transportation system.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A railway car comprising an elongated center sill supported at the opposite ends thereof by a pair of trucks, said center sill including a pair of longitudinally extending and laterally spaced-apart beams respectively carrying flanges at the tops thereof, said center sill having a storage well therein arranged between said beams and provided with a top access opening thereinto, a standard carried by said center sill and selectively movable through said top access opening between a storage position disposed in said storage well and between said beams and below the flanges thereof and an erected position disposed out of said storage well and from between said beams and above the flanges thereof, means including an element carried by the lower portion of said standard and a cooperating guideway carried by said center sill for supporting said standard in its erected position for guided longitudinal movements with respect to said center sill, said guideway being located between said beams and below the flanges thereof, mechanism carried by the top of said standard and selectively operative to secure thereto a cooperating load that is also adapted to be supported upon said center sill for longitudinal movements with respect thereto during the transportation thereof, a motion limiting and cushioning mechanism carried by said center sill and disposed between said beams and below said flanges, and a connector mechanism for selectively connecting together the lower portion of said standard and said motion limiting and cushioning mechanism, so as to limit and to cushion fore-and-aft movements of said connected standard longitudinally with respect to said center sill and the corresponding movements of the connected load longitudinally of said center sill.

2. The railway car set forth in claim 1, wherein said connector mechanism is carried by said standard and is selectively operative into active and inactive positions with respect to said motion limiting and cushioning mechanism, said connector mechanism in its active position engaging and holding said motion limiting and cushioning mechanism and in its inactive position disengaging and releasing said motion limiting and cushioning mechanism, whereby said standard is restrained in its erected position by operation of said connector mechanism into its active position and said standard is prepared for return into its storage position upon operation of said connector mechanism into its inactive position.

3. A railway car for transporting road semi-trailers of the type including a rear end carrying road wheels and a front end carrying a king pin; said railway car comprising a longitudinally extending hollow center sill, a pair of trucks supporting the opposite ends of said center sill, said center sill being adapted to support a trailer mounted upon the top thereof, said center sill having a storage well therein provided with a top access opening thereinto, a standard carried by said center sill and selectively movable through said top access opening between a storage position disposed within said storage well and below the top of said center sill and an erected position disposed out of said storage well and above the top of said center sill, track means carried by said center sill for supporting said standard in its erected position for guided longitudinal movements with respect to said center sill, a motion limiting and cushioning mechanism carried by said center sill, a connector mechanism for selectively connecting together the lower portion of said standard in its erected position and said motion limiting and cushioning mechanism, and a fifth-wheel mechanism carried by the upper portion of said standard and selectively operative into active and inactive positions with respect to the cooperating king pin of a trailer mounted upon the top of said center sill, said fifth-wheel mechanism in its active position engaging and holding the cooperating king pin and in its inactive position disengaging and releasing the cooperating king pin, whereby said motion limiting and cushioning mechanism effects limited and cushioned fore-and-aft movements of said connected standard longitudinally of said center sill, so as to effect corresponding movements of a connected trailer mounted upon the top of said center sill.

4. A railway car for transporting indiscriminately road semi-trailers of first and second types, wherein the first type of trailer includes a rear end carrying road wheels of standard road gauge and a front end carrying a king pin, and the second type of trailer includes a rear end carrying both road wheels of standard road gauge and track rollers of given narrow gauge depending therefrom and disposed inwardly of and above the road wheels thereby and a front end carrying a king pin; said railway car comprising a longitudinally extending hollow center sill, a pair of trucks supporting the opposite ends of said center sill, a pair of longitudinally extending and laterally spaced-apart rails provided on the top of said center sill and constituting a track of said given narrow gauge, a pair of longitudinally extending and laterally spaced-apart platforms carried by the opposite sides of said center sill and projecting outwardly therefrom and disposed below the top thereof and constituting a roadway of said standard road gauge, said roadway being arranged to engage and to support the road wheels of the first type trailer so as to mount the same upon the top of said center sill in straddling relation with said track and with the underportion thereof positioned above said track and out of contact therewith, said track being arranged to engage and to support the track rollers carried by the second type trailer so as to mount the same upon the top of said center sill with the road wheels thereof projecting outwardly over said roadway and with the road wheels positioned above said roadway and out of contact therewith, said center sill having a storage well therein provided with a top access opening thereinto, a standard carried by said center sill and selectively movable through said top access opening between a storage position disposed within said storage well and below the top of said center sill and an erected position disposed out of said storage well and above the top of said center sill, said standard in its erected position being disposed below the front end of said mounted trailer and supporting the same upon said center sill, a guideway carried by said center sill for supporting said standard in its erected position for guided longitudinal movements with respect to said center sill, fifth-wheel mechanism carried by the upper portion of said standard and cooperating with the king pin carried by the supported front end of the mounted trailer and regardless of the type thereof, said fifth-wheel mechanism being selectively operative into active and inactive positions with respect to the cooperating king pin, said fifth-wheel mechanism in its active position engaging and holding the cooperating king pin and in its inactive position disengaging and releasing the cooperating king pin, said standard and a mounted trailer being movable as a unit longitudinally of said center sill and regardless of the type of the trailer, a motion limiting and cushioning mechanism carried by said center sill, and a connector mechanism for selectively connecting together said standard and said motion limiting and cushioning mechanism, so as to limit and to cushion fore-and-aft movements of said connected unit longitudinally of said center sill and regardless of the type of the trailer.

5. A railway car for transporting a road semi-trailer including a rear end carrying road wheels of standard road gauge and a front end carrying a king pin; said railway car comprising a longitudinally extending hollow center sill, a pair of trucks supporting the opposite ends of said center sill, a pair of longitudinally extending and laterally spaced-apart platforms carried by the opposite sides of said center sill and projecting outwardly therefrom and disposed below the top thereof and constituting a roadway of said standard road gauge, said roadway being arranged to engage and to support the road wheels of a trailer so as to mount the same upon the top of said center sill in straddling relation therewith and with the underportion thereof positioned above said center sill and out of contact therewith, said center sill having a storage well therein provided with a top access opening thereinto, a standard carried by said center sill and selectively movable through said top access opening between a storage position disposed within said storage well and below the top of said center sill and erected position disposed out of said storage well and above the top of said center sill, said standard in its erected position being disposed below the front end of said mounted trailer and supporting the same upon said center sill, a guideway carried by said center sill for supporting said standard in its erected position for guided longitudinal movements with respect to said center sill, fifth-wheel mechanism carried by the upper portion of said standard and cooperating with the king pin carried by the supported front end of the mounted trailer, said fifth-wheel mechanism being selectively operative into active and inactive positions with respect to the cooperating king pin, said fifth-wheel mechanism in its active position engaging and holding the cooperating king pin and in its inactive position disengaging and releasing the cooperating king pin, said standard and a mounted trailer being movable as a unit longitudinally of said center sill, a motion limiting and cushioning mechanism carried by said center sill, and a connector mechanism for selectively connecting together said standard and said motion limiting and cushioning mechanism, so as to limit and to cushion fore-and-aft movements of said connected unit longitudinally of said center sill.

6. In a freight transportation system comprising a railway car including a longitudinally extending hollow frame supported at the opposite ends thereof by a pair of trucks, a road semi-trailer including a rear end carrying road wheels and a front end carrying a king pin, a tractor including a chassis carrying road wheels, a first fifth-wheel mechanism carried by the rear end of said tractor and adapted selectively to couple and to uncouple the king pin of said trailer, a standard carried by said railway car and adapted to be moved selectively between a storage position disposed within said hollow frame and below the top thereof and an erected position disposed out of said hollow frame and above the top thereof, and a second fifth-wheel mechanism carried by the upper portion of said standard and adapted selectively to couple and to uncouple the king pin of said trailer; the method of loading said trailer upon said railway car comprising placing said first fifth-wheel mechanism in its supporting position below the front end of said trailer and coupled to said king pin, moving said tractor and said coupled trailer as a unit longitudinally onto the frame of said railway car and under the motive power of said tractor, connecting the rear end of said tractor to said standard when said standard is in its storage position, moving said standard from its storage position into its erected position under the motive power of said tractor and so that said standard is disposed below the front end of said trailer and adjacent to the rear end of said tractor and so that said second fifth-wheel mechanism is positioned behind said king pin, actuating said first fifth-wheel mechanism to uncouple said king pin, and then moving said tractor and said connected standard as a unit longitudinally of the frame of said railway car in the forward direction with respect to said trailer and under the motive power of said tractor, so as to move said first fifth-wheel mechanism from its supporting position below the front end of said trailer and to move said second fifth-wheel mechanism into its supporting position below the front end of said trailer and coupled to said king pin.

7. In a freight transportation system comprising a railway car including a longitudinally extending hollow frame supported at the opposite ends thereof by a pair of trucks, a road semi-trailer including a rear end carrying road wheels and a front end carrying a king pin, a tractor including a chassis carrying road wheels, a first fifth-wheel mechanism carried by the rear end of said tractor and adapted selectively to couple and to uncouple the king pin of said trailer, a standard carried by said railway car and adapted to be moved selectively between a storage position disposed within said hollow frame and below the top thereof and an erected position disposed out of said hollow frame and above the top thereof, and a second fifth-wheel mechanism carried by the upper portion of said standard and adapted selectively to couple and to uncouple the king pin of said trailer; the method of loading said trailer upon said railway car comprising placing said first fifth-wheel mechanism in its supporting position below the front end of said trailer and coupled to said king pin, backing said tractor and said coupled trailer as a unit in the rearward direction onto the frame of said railway car and under the motive power of said tractor, connecting the rear end of said tractor to said standard when said standard is in its storage position, moving said standard from its storage position into its erected position under the motive power of said tractor and so that said standard is disposed below the front end of said trailer and adjacent to the rear end of said tractor and so that said second fifth-wheel mechanism is positioned behind said king pin, actutaing said first fifth-wheel mechanism to uncouple said king pin, and then moving said tractor and said connected standard as a unit longitudinally of the frame of said railway car in the forward direction with respect to said trailer and under the motive power of said tractor, so as to move said first fifth-wheel mechanism from its supporting position below the front end of said trailer and to move said second fifth-wheel mechanism into its supporting position below the front end of said trailer and coupled to said king pin.

8. In a freight transportation system comprising a railway car including a longitudinally extending hollow frame supported at the opposite ends thereof by a pair of trucks, a motion limiting and cushioning mechanism carried by said railway car and disposed within said hollow frame and below the top thereof, a road semi-trailer including a rear end carrying road wheels and a front end carrying a king pin, a tractor including a chassis carrying road wheels, a first fifth-wheel mechanism carried by the rear end of said tractor and adapted selectively to couple and to uncouple the king pin of said tailer, a standard carried by said railway car and adapted to be moved selectively between a storage position disposed within said hollow frame and below the top thereof and an erected position disposed out of said hollow frame and above the top thereof, and a second fifth-wheel mechanism carried by the upper portion of said standard and adapted selectively to couple and to uncouple the king pin of said trailer; the method of loading said trailer upon said railway car comprising placing said first fifth-wheel mechanism in its supporting position below the front end of said trailer and coupled to said king pin, moving said tractor and said coupled trailer as a unit longitudinally onto the frame of said railway car and under the motive power of said tractor, connecting the rear end of said tractor to said standard when said standard is in its storage position, moving said standard from its storage position into its erected position under the motive power of said tractor and so that said standard is disposed below the front end of said trailer and adjacent to the rear end of said tractor and so that said second fifth-wheel mechanism is positioned behind said king pin, actuating said first fifth-wheel mechanism to uncouple said king pin, moving said tractor and said connected standard as a unit longitudinally of the frame of said railway car in the forward direction with respect to said trailer and under the motive power of said tractor, so as to move said first fifth-wheel mechanism from its supporting position below the front end of said trailer and to move said second fifth-wheel mechanism into its supporting position below the front end of said trailer and coupled to said king pin, moving said tractor and said connected standard and said coupled trailer as a unit longitudinally of the frame of said railway car and under the motive power of said tractor so as to position the lower portion of said standard above said motion limiting and cushioning mechanism, connecting the lower portion of said standard in its erected position to said motion limiting and cushioning mechanism, disconnecting said standard and the rear end of said tractor, and then moving said tractor under its own motive power longitudinally from the frame of said railway car.

9. A freight transportation system comprising a road vehicle of the semi-trailer type including ta rear end carrying road wheels and a front end carrying a king pin, a railway car including a longitudinally extending hollow center sill supported at the opposite ends thereof by a pair of trucks, means disposed below the rear end of said trailer for mounting the same upon the top of said center sill for longitudinal movements therealong and with the road wheels carried by said trailer disposed in straddling relation with respect to said center sill, said center sill having a storage well therein provided with a top access opening thereinto, a standard carried by said center sill and selectively movable through said top access opening between a storage position disposed within said storage well and below the top of said center sill and an erected position disposed out of said storage well and above the top of said center sill, said standard in its erected position being disposed below the front end of said mounted trailer and supporting the same upon said center sill, track means carried by said center sill for supporting said standard in its erected position for guided longitudinal movements therealong and with respect to said center sill, fifth-wheel mechanism carried by the upper portion of said standard and cooperating with the king pin carried by the supported front end of said mounted trailer, said fifth-wheel mechanism being selectively operative into active and inactive positions with respect to said cooperating king pin, said fifth-wheel mechanism in its active position engaging and holding said cooperating king pin and in its inactive position disengaging and releasing said cooperating king pin, whereby said mounted trailer and said standard are movable as a unit longitudinally of said center sill, a motion limiting and cushioning mechanism carried by said center sill, and a connector mechanism for selectively connecting together the lower portion of said standard in its erected position and said motion limiting and cushioning mechanism, so as to limit and to cushion fore-and-aft movements of said connected unit longitudinally of said center sill.

10. A railway car for transporting road semi-trailers of the type including a rear end carrying road wheels and a front end carrying a king pin; said railway car comprising a longitudinally extending hollow center sill, a pair of trucks supporting the opposite ends of said center sill, said center sill being adapted to support a trailer mounted upon the top thereof, said center sill having a storage well therein provided with a top access opening thereinto, a track carried by said center sill, a standard provided with rollers engaging said track and selectively movable therealong through said top access opening between a storage position disposed within said storage well and below the top of said center sill and an erected position disposed out of said storage well and above the top of said center sill, said track also accommodating guided rolling movements of said standard in its erected position longitudinally with respect to said center sill, a motion limiting and cushioning mechanism carried by said center sill, a connector mechanism for selectively connecting together the lower portion of said standard in its erected position and said motion limiting and cushioning mechanism, and a fifth-wheel mechanism carried by the upper portion of said standard and selectively operative into active and inactive positions with respect to the cooperating king pin of a trailer mounted upon the top of said center sill, said fifth-wheel mechanism in its active position engaging and holding the cooperating king pin and in its inactive position disengaging and releasing the cooperating king pin, whereby said motion limiting and cushioning mechanism effects limited and cushioned fore-and-aft rolling movements of said connected standard longitudinally of said center sill, so as to effect corresponding movements of a connected trailer mounted upon the top of said center sill.

11. A freight transportation system comprising a railway car including a longitudinally extending hollow center sill supported at the opposite ends thereof by a pair of trucks, said center sill having a storage well therein provided with a top access opening thereinto, a road semi-trailer including a front end carrying a king pin, a tractor including a rear end carrying a first fifth-wheel mechanism adapted selectively to couple and to uncouple the king pin of said trailer, a standard carried by said center sill and selectively movable through said top access opening between a storage position disposed within said storage well and below the top of said center sill and an erected position disposed out of said storage well and above the top of said center sill, a second fifth-wheel mechanism carried by the upper portion of said standard and movable therewith, said second fifth-wheel mechanism being adapted selectively to couple and to uncouple the king pin of said trailer, said tractor and said trailer being movable as a unit either along a roadway or in loaded position along the top of said center sill when said first fifth-wheel mechanism is coupled to said king pin, means carried by said tractor and operable when both said tractor and said trailer are mounted upon the top of said center sill for actuating said first fifth-wheel mechanism to uncouple said king pin, additional means carried by said tractor and engageable with said standard when both said tractor and said trailer are mounted upon the top of said center sill for moving said standard from its storage position disposed in said storage well into its erected position disposed out of said storage well so as simultaneously to move said uncoupled first fifth-wheel mechanism from below the front end of said trailer and to move said second fifth-wheel mechanism below the front end of said trailer and to actuate said second fifth-wheel mechanism to couple said king pin, track means carried by said center sill and supporting said standard in its erected position for guided longitudinal movements with respect to said center sill, motion limiting and cushioning mechanism carried by said center sill, and connector mechanism for selectively connecting together the lower portion of said standard in its erected position and said motion limiting and cushioning mechanism, whereby said motion limiting and cushioning mechanism effects limited and cushioned movements of said connected standard longitudinally of said center sill and corresponding limited and cushioned movements of said supported trailer in its mounted position longitudinally of said center sill.

12. A freight transportation system comprising a railway car including a longitudinally extending hollow center sill supported at the opposite ends thereof by a pair of trucks, said center sill having a storage well therein provided with a top access opening thereinto, a road semitrailer including a front end carrying a king pin, a tractor including a rear end carrying a first fifth-wheel mechanism adapted selectively to couple and to uncouple the king pin of said trailer, a standard carried by said center sill and selectively movable through said top access opening between a storage position disposed within said storage well and below the top of said center sill and an erected position disposed out of said storage well and above the top of said center sill, a second fifth-wheel mechanism carried by the upper portion of said standard and movable therewith, said second fifth-wheel mechanism being adapted selectively to couple and to uncouple the king pin of said trailer, said tractor and said trailer being movable as a unit either along a roadway or in loaded position along the top of said center sill when said first fifth-wheel mechanism is coupled to said king pin, means for actuating said second fifth-wheel mechanism to uncouple said king pin, means carried by said tractor and engageable with said standard in its erected position when both said tractor and said trailer are mounted upon the top of said center sill for moving said uncoupled second fifth-wheel mechanism from below the front end of said trailer and for moving said standard from its erected position disposed out of said storage well back into its storage position disposed in said storage well and for simultaneously moving said first fifth-wheel mechanism below the front end of said trailer so as to actuate said first fifth-wheel mechanism to couple said king pin, track means carried by said center sill and supporting said standard in its erected position for guided longitudinal movements with respect to said center sill, motion limiting and cushioning mechanism carried by said center sill, and connector mechanism for selectively connecting together the lower portion of said standard in its erected position and said motion limiting and cushioning mechanism, whereby said motion limiting and cushioning mechanism effects limited and cushioned movements of said connected standard longitudinally of said center sill and corresponding limiting and cushioned movements of said supported trailer in its mounted position longitudinally of said center sill.

References Cited in the file of this patent

UNITED STATES PATENTS

| | | |
|---|---|---|
| 2,845,878 | Gutridge | Aug. 5, 1958 |
| 2,846,172 | Gutridge | Aug. 5, 1958 |
| 2,864,321 | Clejan | Dec. 16, 1958 |
| 2,905,104 | Bounds | Sept. 22, 1959 |

OTHER REFERENCES

"Railway Freight Traffic," February 1958, page 27 (Rock Island Holds Piggyback Clinic). (Copy available Div. 34.)

UNITED STATES PATENT OFFICE
CERTIFICATE OF CORRECTION

Patent No. 3,016,025

January 9, 1962

Deodat Clejan

It is hereby certified that error appears in the above numbered patent requiring correction and that the said Letters Patent should read as corrected below.

Column 14, line 66, after "wheels" insert -- carried --; column 15, line 63, after "and" insert -- an --; column 17, line 27, for "tailer" read -- trailer --; line 70, for "ta" read -- a --.

Signed and sealed this 8th day of May 1962.

(SEAL)
Attest:

ERNEST W. SWIDER
Attesting Officer

DAVID L. LADD
Commissioner of Patents